(12) United States Patent
Jacobs et al.

(10) Patent No.: US 6,431,500 B1
(45) Date of Patent: Aug. 13, 2002

(54) FLEXIBLE TUBE OR CORD ANCHORING APPARATUS

(76) Inventors: Gregory J. Jacobs, 65 Clarkson St., #508, Denver, CO (US) 80218; Fabrizio L. Constanza, 935 Pennsylvania St., #6, Denver, CO (US) 80203

( * ) Notice: Subject to any disclaimer, the term of this patent is extended or adjusted under 35 U.S.C. 154(b) by 0 days.

(21) Appl. No.: 09/724,338

(22) Filed: Nov. 28, 2000

(51) Int. Cl.$^7$ .................................................. F16L 3/00
(52) U.S. Cl. ...................... 248/51; 248/205.3; 248/551; 24/129 R
(58) Field of Search .......................... 248/51, 73, 74.1, 248/551, 205.3, 316.7; 70/58; 24/129 R, 304, 30.5 S

(56) References Cited

U.S. PATENT DOCUMENTS

| | | |
|---|---|---|
| 3,409,257 A | 11/1968 | Elm |
| 3,430,300 A | 3/1969 | Doan |
| 3,491,971 A | 1/1970 | Fisher |
| 4,074,397 A | 2/1978 | Rosin ............................ 24/73 |
| 4,417,710 A | 11/1983 | Adair ........................... 248/51 |
| 4,901,960 A | 2/1990 | Gary ........................ 248/205.3 |
| 4,962,907 A | 10/1990 | Gary ........................ 248/205.3 |
| 5,082,111 A | 1/1992 | Corbitt, Jr. et al. ......... 206/363 |
| 5,275,367 A | 1/1994 | Frye ........................ 248/205.3 |
| 5,794,463 A * | 8/1998 | McDaid ....................... 248/553 |
| 5,937,678 A * | 8/1999 | Kuo .............................. 70/18 |
| 6,105,687 A * | 8/2000 | Hansson ....................... 248/52 |
| 6,105,922 A * | 8/2000 | Derman ....................... 248/551 |

* cited by examiner

Primary Examiner—Leslie A. Braun
Assistant Examiner—Gwendolyn Baxter
(74) Attorney, Agent, or Firm—Harold A. Burdick

(57) ABSTRACT

An anchoring apparatus for locating a flexible tube or cord at a selected location between a fixed terminal and a movable device attached to one end of the tube or cord is disclosed. The apparatus includes a base having a securing clip extending from a circular platform, and a cover attached to the base and including a circular cover body and a raised shield section. A mounting material layer is affixed to a bottom surface of the base. A top portion of the shield section has an access opening thereacross extending between support openings at first and second side walls of the shield section. The tube or cord is releasably received at the clip through the access opening and support openings and is cooperatively held at a position relative to the base by the clip and the support openings.

18 Claims, 2 Drawing Sheets

FLEXIBLE TUBE OR CORD ANCHORING APPARATUS

FIELD OF THE INVENTION

This invention relates to tube or cord securement, and, more particularly, relates to apparatus for anchoring, at a selected location, a section of a flexible tube or cord connected with a device at one end subjected, in use, to movement.

BACKGROUND OF THE INVENTION

Devices have been suggested and/or utilized for stabilizing location of a flexible tube or cord used, for example, in industrial, household, computer, medical, dental or surgical applications. Some devices of this type have heretofore included nothing more than an exposed clip with means of attachment at a selected surface (see, for example, U.S. Pat. Nos. 5,323,992, 5,178,354, 4,910,362, 3,659,319, 3,491,971, and 3,409,257) or various hook and loop material or adhesive material securements (see, for example, U.S. Pat. Nos. 5,082,111 4,417,710, 4,074,397 and 3,430,300).

Other devices of this type, ranging from the simple to the complex, have been suggested and/or utilized for particular application in anchoring the cord associated with a computer mouse (see U.S. Pat. Nos. 5,844,775, 5,723,821, 5,598,921 and 5,398,895, for example). Still other, more elaborate, devices have been suggested for hospital applications (see U.S. Pat. Nos. 4,770,377 and 4,702,443).

While devices of this type continue to be sought after to resolve problems related to flexible cord or tube snagging, kinking, and/or obtrusiveness, and, in some applications, problems of dragging and/or impediment of free movement of an implement associated with the flexible tube or cord, heretofore known devices have not proved altogether satisfactory in resolving these problems and/or are themselves another source of some such problems.

For example, many of the heretofore known devices create no clearance from the surface at which the cord is anchored, thereby doing little to keep a flexible tube or cord free from surface snags and/or drag as an implement to which it is attached is moved over the same surface. In addition, some devices are constructed so that the device itself can become the source of undesired tube or cord snagging thus restricting free movement of the tube or cord, are exposed such that tube or cord movement may result in dislodgment from the device, and/or risk kinking of the tube or cord in use. Moreover, some heretofore known devices are unduly expensive to produce and/or cumbersome to use. Further improvement in such flexible tube or cord anchoring devices could thus still be utilized.

SUMMARY OF THE INVENTION

This invention provides an apparatus for anchoring a flexible tube or cord that is particularly useful for anchoring, at a selected location, a section of a tube or cord extending between a fixed terminal and a movable device attached to one end of the tube or cord. In use, the apparatus of this invention resolves problems of cord or tube snagging, kinking, and/or obtrusiveness while imposing no impediment to, or drag on free movement of, an implement associated with the flexible tube or cord. The apparatus is structured to keep the flexible tube or cord free from surface snags as an implement to which it is attached is moved over the same surface, to resist unintended entanglements with the tube or cord, and to prevent unintended tube or cord kinking and/or dislodgment. The apparatus is inexpensive to produce and simple to apply and use.

The apparatus has a base including a securement member, or clip, extending therefrom. The securement member is preferably defined by spaced first and second legs, the legs having a length. A cover is attachable at the base and includes a raised shield section having an access opening thereacross. A mounting material layer is affixed at an opposite surface of the base for selected location and securement of the apparatus. In use, the tube or cord is releasably receivable at the securement member through the access opening at the shield section of the cover, the securement member (and thus the tube or cord received therein) being recessed relative to the shield section.

The cover is preferably a molded unit having a coved interior surface that extends to the access opening so that the access opening is spaced from the base when the base and cover are attached. The shield section is configured with a top portion having a width at one part only slightly greater than the length of the legs of the securement member. First and second side walls adjacent to the top portion each have a tube or cord support opening defining support surfaces adjacent to the one part of the top portion and to opposite ends of the access opening. The support openings are positioned so as to be adjacent to the space between the first and second legs of the clip upon assembly of the apparatus.

It is therefore an object of this invention to provide an improved flexible tube or cord anchoring apparatus.

It is another object of this invention to provide an improved apparatus for anchoring, at a selected location, a section of a flexible tube or cord extending between a fixed terminal and a movable device attached to one end of the tube or cord.

It is still another object of this invention to provide an apparatus for anchoring a flexible tube or cord that resolves problems of tube or cord snagging, kinking, and/or obtrusiveness while imposing no impediment to, or drag on free movement of, an implement associated with the flexible tube or cord.

It is yet another object of this invention to provide an apparatus for anchoring a flexible tube or cord that is structured to keep the flexible tube or cord free from surface snags as an implement to which it is attached is moved over the same surface, to resist unintended entanglements with the tube or cord, and to prevent unintended tube or cord kinking and/or dislodgment during use.

It is another object of this invention to provide an apparatus for anchoring a flexible tube or cord that is inexpensive to produce and simple to apply and use.

It is still another object of this invention to provide an apparatus for anchoring a flexible tube or cord that includes a base unit having a securement member, a cover unit attachable at the base unit and including a raised shield section with an opening thereacross, the tube or cord being releasably receivable at the securement member of the base unit through the opening at the shield section of the cover unit, the securement member of the base unit and the tube or cord received therein being recessed relative to the shield section of the cover unit.

It is yet another object of this invention to provide an apparatus for anchoring a flexible tube or cord at a location between a fixed terminal and a movable device at opposite ends of the tube or cord, the apparatus having a base unit including a securement member configured to releasably receive the tube or cord, and a molded cover unit attachable at the base unit and having a coved interior surface extending to an opening spaced from the base unit when the units are attached, tube or cord support surfaces being defined adjacent to opposite ends of the opening, the securement member of the base unit being recessed relative to the opening at the cover unit.

It is still another objection of this invention to provide an apparatus for anchoring a flexible tube or cord that includes a base with a clip extending therefrom, the clip defined by spaced first and second legs, the legs having a length, a cover connected with the base and including a raised shield section, the shield section having a top portion with a width at one part only slightly greater than the length of the legs of the clip and having first and second side walls adjacent to the top portion, each of the first and second side walls having a tube or cord support opening adjacent to the one part of the top portion and positioned for location adjacent to the space between the first and second legs of the clip, the clip of the base recessed relative to the top portion of the shield section of the cover, and a mounting material layer affixed to the base.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
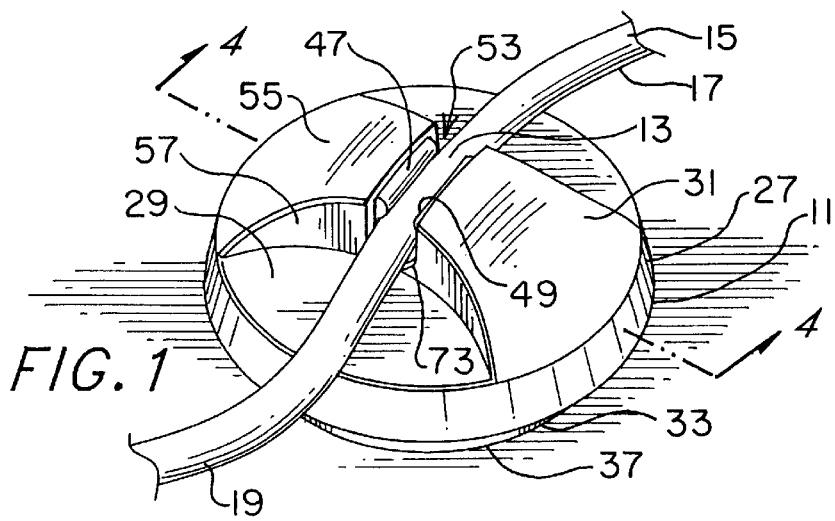
FIG. 1 is a perspective view of the tube or cord anchoring aparatus of this invention in use.

Apparatus 11 of this invention is illustrated in FIG. 1 in use to anchor a section 13 of flexible tube or cord 15 at a selected location. Tube or cord 15 is often connected between a fixed terminal at one end and a movable (i.e., hand manipulable, for example) device (such as a medical, dental, surgical or other hand held device or tool, computer mouse or the like) at its other end, so that when anchored at section 13 by apparatus 11 a substantially immobilized length 17 (leading to the fixed terminal) and a freely movable length 19 (leading to the movable device) of tube or cord 15 are defined.

As shown in FIGS. 1 through 4, apparatus 11 preferably includes three parts: molded base unit 21 having securing clip 23 extending from circular platform 25; molded cover unit 27 including circular cover body 29 and raised shield section 31; and mount 33.

Figure 2:
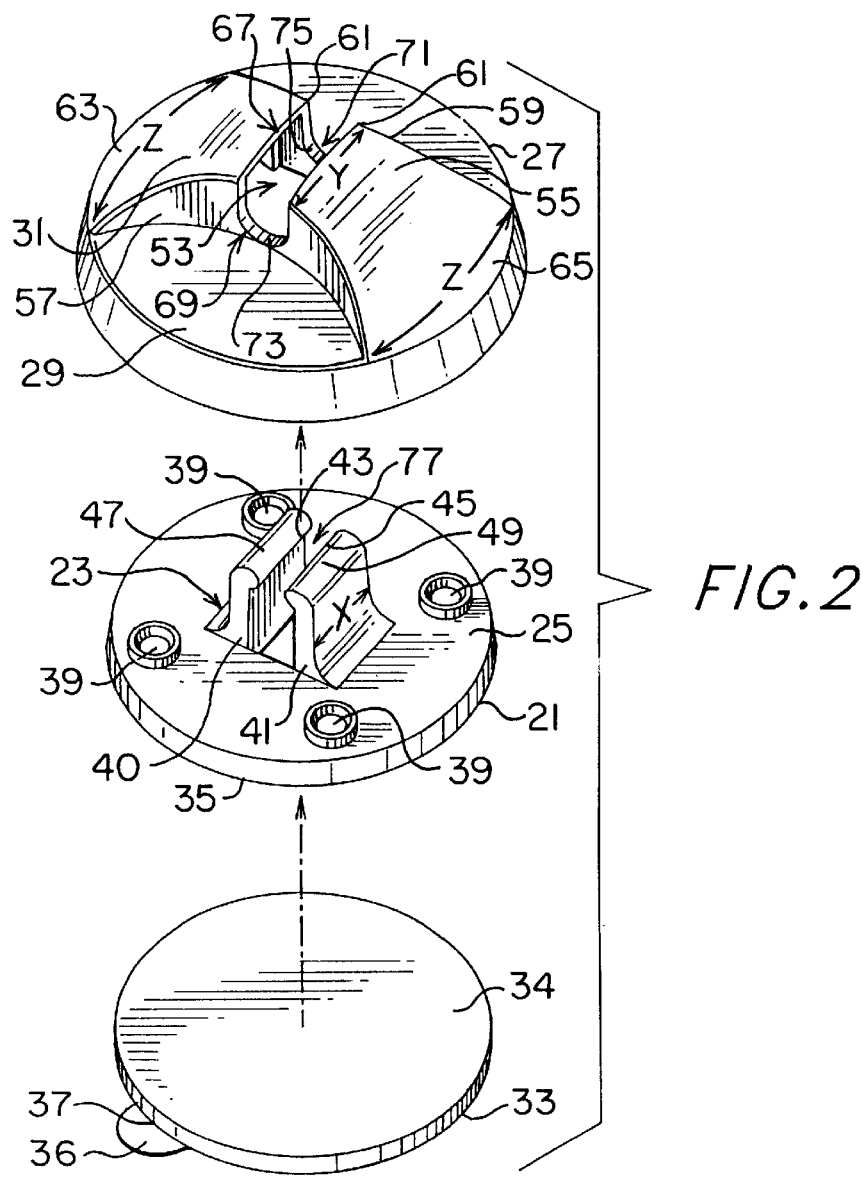
FIG. 2 is an exploded perspective view of the apparatus illustrated in use in FIG. 1.

Mount 33 is preferably a mounting material layer (such as an adhesive foam pad) adhered at adhesive surface 34 to bottom surface 35 of base unit 21. In such case, mount 33 includes disposable removable protective layer 36 at exposable adhesive surface 37 to maintain tack and handlability until apparatus 11 is ready to be secured at the selected location. Base unit 21 and cover unit 27 are attached, permanently or releasably, before use utilizing any known methods and/or materials (such as adhesives, sonic welding, molded pin (38) and detent (39) structures—as shown in FIGS. 2 and 3—or the like) suitable to the task.

Securing clip 23 is defined by spaced yieldable legs 40 and 41 each having an inwardly facing shoulder (43 and 45, respectively) at terminal ends 47 and 49, respectively, of legs 40 and 41. Legs 40 and 41 extend substantially perpendicularly from platform 25 and have a selected length dimension ("X" in FIG. 2).

Figure 3:
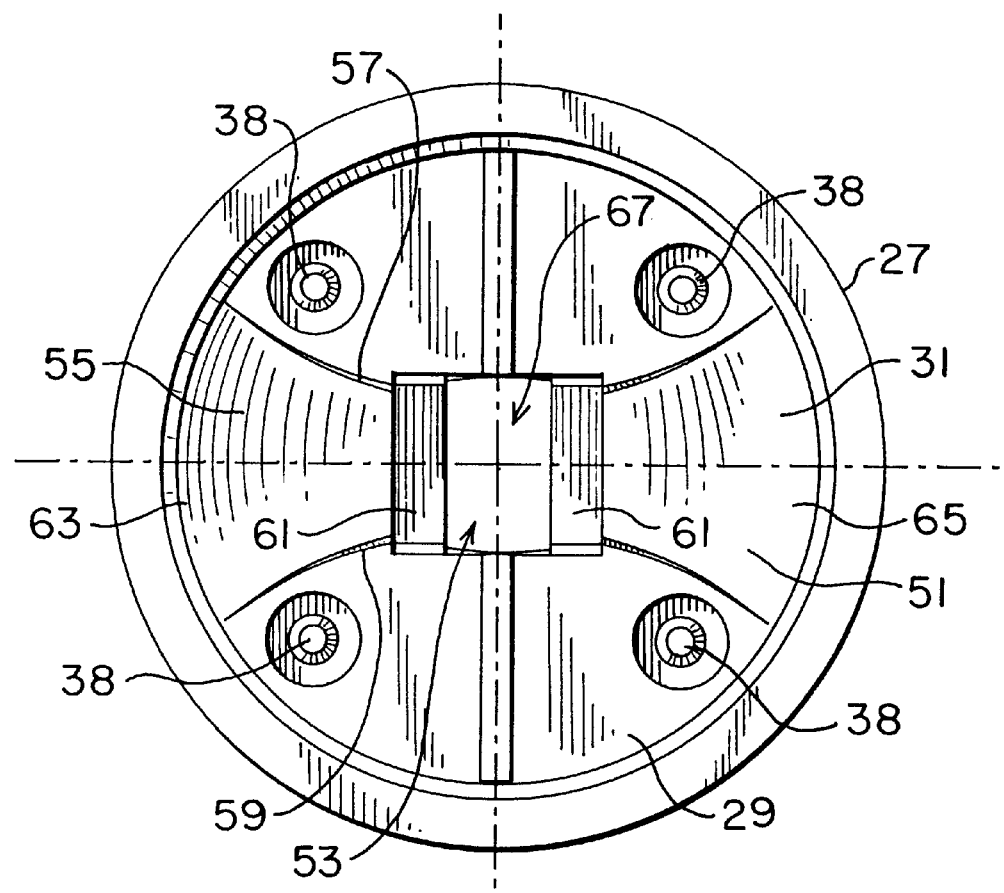
FIG. 3 is a bottom plan view of the cover/shield unit utilized in this invention.
Figure 4:
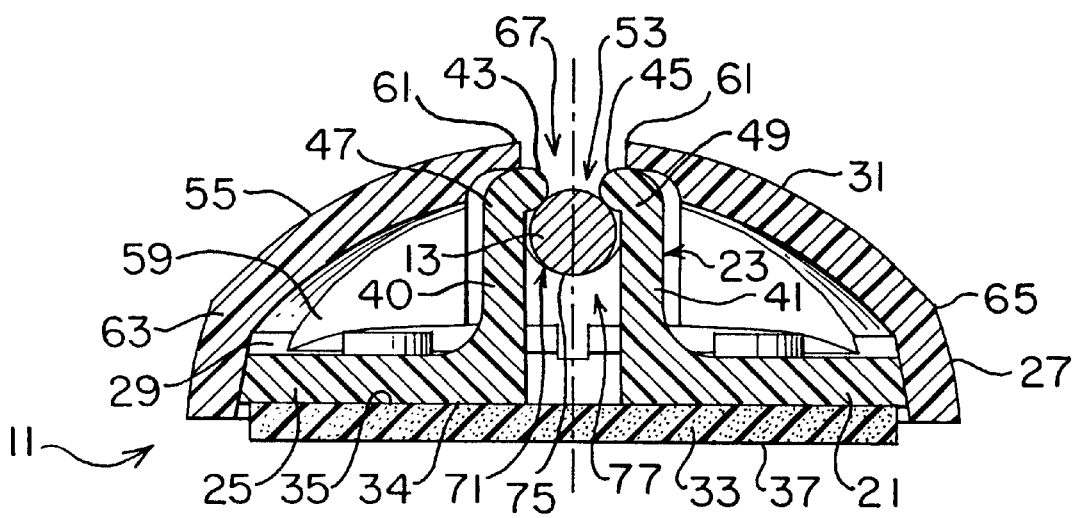
FIG. 4 is a sectional view taken through section lines 4—4 of FIG. 1.

As shown in FIG. 3, cover unit 27 has coved interior surface 51 extending to opening 53. As shown in FIGS. 1, 2 and 4, shield section 31 of cover unit 27 is defined by arched top portion 55, sloping at its ends from cover body 29, and arched side walls 57 and 59 between top portion 55 and cover body 29. The contours of apparatus 11 as thus defined serve to reduce likelihood of snagging of length 19 of tube or cord 15 on apparatus 11 during use of an implement connected to the length 19 of tube or cord 15. Top portion 55 has a width dimension ("Y" in FIG. 2) at one part 61 only slightly greater than length dimension "X" of legs 40 and 41 of clip 23, and another width dimension ("Z" in FIG. 2) at its ends 63 and 65 greater than width dimension "Y".

Opening 53 is defined by access opening 67 across top portion 55 at one part 61 and extending between support openings 69 and 71 at side walls 57 and 59, respectively, adjacent to opposite ends of access opening 67. Side walls 57 and 59 each have a tube or cord support surface (73 and 75, respectively) at support openings 69 and 71. Access opening 67 and support openings 69 and 71 of opening 53 are located to be adjacent to space 77 between legs 40 and 41 of clip 23 when units 21 and 27 are assembled.

When assembled, opening 53 in cover unit 27 is spaced from base unit 21 with support opening 69 and 71 (and so support surfaces 73 and 75) spaced from platform 25. Legs 40 and 41 of clip 23 extend a distance and direction from platform 25 sufficient to terminate (at ends 47 and 49) directly beneath access opening 67 at top portion 55 of shield section 31 of cover unit 27. Thus clip 23, and particularly tube or cord receiving space 77, is closely fit at shield section 31 of cover unit 27 adjacent to opening 53. This recessed arrangement of securing clip 23 relative to shield section 31 and opening 53 further assures less likelihood of snagging of length 19 of tube or cord 15, as well as better security (less likelihood of dislodgment) of tube or cord section 13 in clip 23.

In use, as may be appreciated from the forgoing, apparatus 11 (after assembly) is configured so that section 13 of flexible tube or cord 15 is releasable receivable at securing clip 23 of base unit 21 through opening 53 (i.e., at access opening 67 and support openings 69 and 71) at shield section 31 of cover unit 27, legs 40 and 41 yielding as section 13 is urged against shoulders 43 and 45 to admit section 13 at space 77 and returning to position thereafter. Tube or cord section 13 is held in a position relative to base unit 21 (slightly elevated relative to platform 25, and thus the surface at which apparatus 11 is located) cooperatively by securing clip 23, clip shoulders 43 and 45 of legs 40 and 41, and support surfaces 73 and 75 defined by support openings 69 and 71 in side walls 57 and 59 of shield section 31 of cover unit 27.

Units 21 and 27 are preferably molded plastic pieces (any suitably rigorous plastic may be used). Sizing of apparatus 11 may be different depending upon the tube or cord application. For use as a computer mouse cord holder, for example, platform 25 of base unit 21 could be about 1.125" in diameter and 0.06" thick. Yieldable legs 40 and 41 may be about 0.06" thick by 0.25" long (length dimension "X" in FIG. 2) and 0.3875" tall. Using a suitable plastic material, these clip dimensions (and the selected dimension of space 77) should allow legs 40 and 41 movement sufficient to accommodate cords ranging in size from 0.11" to 0.17" securely. Cover unit 27 would be about 1.250" in diameter for this application allowing a close fit between platform 25 of base unit 21 and cover body 29 of cover unit 27. Opening 53 threat should provide about a 0.17" gap to allow entry of cords in the defined size range.

As may be appreciated from the foregoing, an improved apparatus for anchoring, at a selected location, a section of a flexible tube or cord extending between a fixed terminal and a movable device attached to one end of the tube or cord is provided that resolves several known problems with such devices. The apparatus is shaped to avoid likelihood of tube or cord snagging, kinking, dislodgment, and/or obtrusiveness while imposing no impediment to or drag on free movement of an implement associated with the flexible tube or cord. The apparatus is simple to use and is inexpensive to produce.

What is claimed is:

1. An apparatus for anchoring a flexible tube or cord comprising:

a base unit including a securement member; and a cover unit attachable at said base unit and including a raised shield section with an opening thereacross, said cover unit including a cover body configured to engage said base unit, said shield section sloping from said cover body to said opening, the tube or cord being releasably receivable at said securement member of said base unit through said opening at said shield section of said cover unit, said securement member of said base unit being recessed relative to said shield section of said cover unit.

2. The apparatus of claim 1 wherein said shield section of said cover unit includes at least a first support surface defined at said opening.

3. The apparatus of claim 2 wherein said base unit includes a platform portion, said securement member extending away from said platform portion, said at least first support surface of said shield section of said cover unit being spaced from said platform portion and adjacent to said securement member when said units are attached.

4. The apparatus of claim 1 further comprising a mounting pad affixed at said base unit and securable at a selected location.

5. The apparatus of claim 1 wherein said base unit includes a circular platform portion, said securement member extending substantially perpendicularly relative to said platform portion.

6. The apparatus of claim 1 wherein said securement member of said base unit includes first and second yieldable legs each having a shoulder at a terminal end thereof.

7. An apparatus for anchoring a flexible tube or cord at a location between a fixed terminal and a movable device at opposite ends of the tube or cord, said apparatus comprising:

a base unit including a securement member defined by spaced first and second yieldable legs configured to releasably receive the tube or cord; and a molded cover unit attachable at said base unit and having a coved interior surface extending to an opening spaced from said base unit when said units are attached, tube or cord support surfaces being defined adjacent to opposite ends of said opening, said securement member of said base unit being recessed relative to said opening at said cover unit.

8. The apparatus of claim 7 wherein said legs of said securement member extend from said base unit a distance and direction sufficient to terminate directly beneath said opening of said cover unit when said units are attached.

9. The apparatus of claim 7 wherein said opening at said cover unit has a dimension only slightly greater than a dimension of said securement member, said cover unit including side walls each having one of said tube or cord support surfaces thereat.

10. The apparatus of claim 7 further comprising a mount affixed at said base unit and securable at a selected location.

11. The apparatus of claim 7 wherein said base unit includes a platform portion, said securement member extending away from said platform portion, said support surfaces of said cover unit being spaced from said platform portion and adjacent to said securement member when said units are attached.

12. An apparatus for anchoring a flexible tube or cord comprising:

a base with a clip extending therefrom, said clip defined by spaced first and second legs, said legs having a length;

a cover connected with said base and including a raised shield section, said shield section having a top portion with a width at one part only slightly greater than said length of said legs of said clip and having first and second side walls adjacent to said top portion, each of said first and second side walls having a tube or cord support opening adjacent to said one part of said top portion and positioned for location adjacent to said first and second legs of said clip, said clip of said base recessed relative to said top portion of said shield section of said cover; and a mounting material layer affixed to said base.

13. The apparatus of claim 12 wherein mounting material layer is an adhesive foam pad.

14. The apparatus of claim 12 wherein said first and second side walls and said top portion of said shield section of said cover are arched.

15. The apparatus of claim 12 wherein said cover includes a cover body configured to engage said base and having said first and second side walls of said shield section extending therefrom, said top portion of said shield section having a second part adjacent to said cover body with a width greater than said one part of said top portion of said shield section.

16. The apparatus of claim 12 wherein said top portion of said shield section of said cover includes an access opening thereacross extending between said support openings at said first and second side walls, the tube or cord being releasably receivable at said clip of said base through said access opening and said support openings at said shield section of said cover and held in a position relative to said base cooperatively by said clip of said base and said support openings at said first and second side walls of said shield section of said cover.

17. The apparatus of claim 16 wherein said base includes a platform portion, said clip extending away from said platform portion, said support openings at said first and second side walls of said shield section of said cover being spaced from said platform portion.

18. The apparatus of claim 12 wherein said base includes a circular platform portion and wherein said cover includes a circular cover body configured to engage said platform portion and having said first and second side walls of said shield section extending therefrom.

* * * * *